United States Patent
Norrie et al.

(10) Patent No.: US 7,647,438 B1
(45) Date of Patent: Jan. 12, 2010

(54) BINARY BASE ADDRESS SORTING METHOD AND DEVICE WITH SHIFT VECTOR

(75) Inventors: Christopher I. W. Norrie, San Jose, CA (US); Christopher Bergen, Cupertino, CA (US); Robert Divivier, San Jose, CA (US); Thomas J. Norrie, San Jose, CA (US)

(73) Assignee: Integrated Device Technology, inc., San Jose, CA (US)

( * ) Notice: Subject to any disclaimer, the term of this patent is extended or adjusted under 35 U.S.C. 154(b) by 324 days.

(21) Appl. No.: 11/382,480

(22) Filed: May 9, 2006

(51) Int. Cl.
*G06F 19/00* (2006.01)
*G06F 12/02* (2006.01)

(52) U.S. Cl. .............. 710/54; 710/3; 710/40; 370/351

(58) Field of Classification Search .............. None
See application file for complete search history.

(56) References Cited

U.S. PATENT DOCUMENTS

| | | | |
|---|---|---|---|
| 4,638,431 A | 1/1987 | Nishimura | |
| 4,641,302 A | 2/1987 | Miller | |
| 4,727,480 A | 2/1988 | Albright et al. | |
| 5,247,691 A | 9/1993 | Sakai | |
| 5,706,460 A | 1/1998 | Craig et al. | |
| 5,761,726 A | 6/1998 | Guttag et al. | |
| 5,867,677 A * | 2/1999 | Tsukamoto | 710/316 |
| 5,884,297 A * | 3/1999 | Noven | 370/395.3 |
| 5,915,097 A | 6/1999 | Chao | |
| 6,005,863 A | 12/1999 | Deng et al. | |
| 6,378,047 B1 | 4/2002 | Meyer | |
| 6,490,288 B1 | 12/2002 | Lin et al. | |
| 6,539,536 B1 * | 3/2003 | Singh et al. | 716/18 |
| 6,810,037 B1 | 10/2004 | Kalapathy et al. | |
| 7,061,861 B1 * | 6/2006 | Mekkittikul et al. | 370/230 |
| 7,124,200 B2 | 10/2006 | Sato et al. | |
| 2001/0002907 A1 | 6/2001 | Jeong et al. | |
| 2002/0009050 A1 * | 1/2002 | Ueno | 370/230 |
| 2002/0087837 A1 | 7/2002 | Samra et al. | |

(Continued)

OTHER PUBLICATIONS

Main, Data Structure & Other Objects Using Java, 1999, Addison-Wesley, pp. 526-529 and 575-582.*

(Continued)

*Primary Examiner*—Henry W. H. Tsai
*Assistant Examiner*—Cheng-Yuan Tseng
(74) *Attorney, Agent, or Firm*—Glass & Associates; Michael R. Hardaway; Kenneth Glass

(57) ABSTRACT

A base address sorting device in a switching device is disclosed that includes an array of base address registers in which each base address register contains a base address, an address shifting device; and a control logic element electrically coupled to the array of base address registers and operable, upon receiving a configuration command comprising a new base address, to implement a method for reconfiguring the contents of the array of base address registers. The method includes determining an insertion point base address register in the array of base address registers into which to write the new base address, shifting the contents of one or more base address registers array to other base address registers to preserve the sorted order, and shifting the contents of the configuration command into the insertion point base address register. The inserting results in preserving the pre-determined order of the register array content.

22 Claims, 8 Drawing Sheets

U.S. PATENT DOCUMENTS

| | | | |
|---|---|---|---|
| 2002/0194486 A1 | 12/2002 | Heinrich et al. | |
| 2003/0023836 A1 | 1/2003 | Catherwood et al. | |
| 2003/0126535 A1 | 7/2003 | Solomon et al. | |
| 2004/0044798 A1* | 3/2004 | Elzur et al. | 709/250 |
| 2004/0162963 A1 | 8/2004 | Cedola | |
| 2004/0202379 A1* | 10/2004 | Boskovic et al. | 382/262 |
| 2005/0220129 A1 | 10/2005 | Boyd | |
| 2006/0114918 A1* | 6/2006 | Ikeda et al. | 370/408 |
| 2006/0117126 A1 | 6/2006 | Leung et al. | |
| 2006/0174048 A1 | 8/2006 | Ohara et al. | |
| 2006/0221954 A1* | 10/2006 | Narayan et al. | 370/389 |
| 2006/0242352 A1* | 10/2006 | Torudbakken et al. | 710/312 |
| 2006/0253619 A1* | 11/2006 | Torudbakken et al. | 710/31 |
| 2007/0097948 A1 | 5/2007 | Boyd et al. | |
| 2007/0097950 A1 | 5/2007 | Boyd et al. | |
| 2007/0143395 A1* | 6/2007 | Uehara et al. | 709/203 |
| 2007/0147359 A1 | 6/2007 | Congdon et al. | |
| 2007/0183393 A1 | 8/2007 | Boyd et al. | |
| 2007/0266179 A1* | 11/2007 | Chavan et al. | 709/250 |

OTHER PUBLICATIONS

PCI Express Base Specification, Mar. 2005, PCI Express, pp. 1-508.*
Xilinx, Using Look-up tables as shift registers in Spartan-3 devices, Xilinx, 2003, pp. 1-18.*
Mindshare et al., PCI Express System Architecture, Mlndshare, 2003, Page numbers not available from electronic edition.*

* cited by examiner (STEPS 601, 602)

(STEPS 603, 604, 605)

(STEP 606)

(STEP 607)

BINARY BASE ADDRESS SORTING METHOD AND DEVICE WITH SHIFT VECTOR

BACKGROUND OF THE INVENTION

Peripheral Component Interconnect (PCI) Express is a third generation Input Output (3GIO) system that implements a serial, switched-packet, point-to-point communication standard at the system level. PCI Express has achieved many advantages over the prior shared bus system, such as quality of service (QoS), high speed peer-to-peer communication between external devices, adaptability, and low pin counts. The basic PCI Express architecture includes a root complex, a PCI Express switch chip, and various external devices. So far, PCI Express switching has only been implemented in a limited number of external devices.

One three-port PCI Express serial switch performs simultaneous comparisons of the target address value of an incoming data packet with the addresses of all possible directly-connected external devices. Since each external device's addressing is defined by a base address and a limit address, there are six comparisons performed for each port. Communication packets can arrive at any of the three ports, so as many as 18 comparisons can be required to be performed, in parallel, within the PCI Express switch, requiring the implementation of sufficient comparators to accomplish the simultaneous comparisons.

As a result of the need to couple more devices to PCI Express systems, there is a need for switches that can accommodate higher number of external devices. Thus, for example, for a PCI Express switch to accommodate 16 external devices, it would require 16 ports. For a PCI Express switch to have 16 ports or more, the total number of comparisons that would be needed using conventional switch architecture can be as many as 512, or more. Switches having 512 comparators are undesirable since comparators take up chip space, consume power, and increase latency of the system.

Thus, there is a need for a method and apparatus that will accommodate connection of a large number of external devices to a serial switch without using an exponentially increased number of comparators and registers and achieving high performance at the same time.

SUMMARY OF THE INVENTION

A novel device and method for reconfiguring base address registers in a switching device is presented that supports rapid binary address searching. The method is implemented in a PCI Express serial switch and accommodates a large number of ports without using the expected exponentially-increased number of comparators and registers. The device enables a serial switch to insert a new configuration into an array of base address registers quickly and accurately, without the need to implement a large number of comparators, and without interrupting rapid switching operations in the switch.

A base address sorting device in a switching device is disclosed that includes an array of base address registers in which each base address register contains a base address, an address shifting device; and a control logic element electrically coupled to the array of base address registers and operable, upon receiving a configuration command comprising a new base address, to implement a method for reconfiguring the contents of the array of base address registers. The method includes determining an insertion point base address register in the array of base address registers into which to write the new base address, shifting the contents of one or more base address registers array to other base address registers to preserve the sorted order, and shifting the contents of the configuration command into the insertion point base address register. The inserting results in preserving the pre-determined order of the register array content.

By using a shift vector, the method and apparatus of the present invention allows for quickly and accurately inserting a new base address configuration into an array of base address registers while preserving the descending order of base addresses. Also, the shift vector of the present invention uses fewer comparators and registers than corresponding prior art systems, resulting in saving considerable semiconductor chip size and power consumption.

These and other advantages of the present invention will become obvious to those of ordinary skill in the art after having read the following detailed description of the preferred embodiments, which are illustrated in the various drawing figures.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Figure 1:
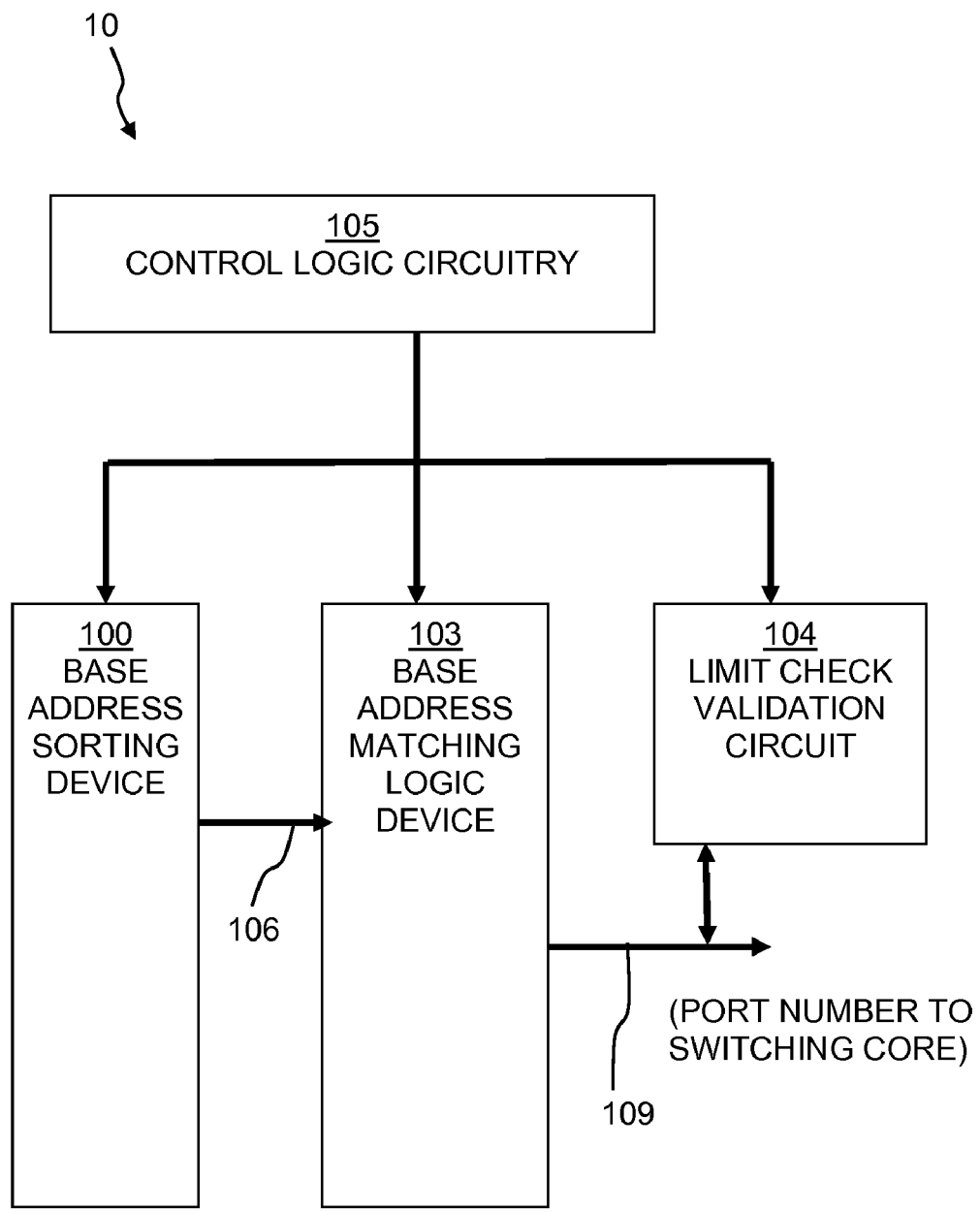
FIG. 1 illustrates a block diagram of a routing device for a multi-port switching device that includes control logic circuitry, a base address sorting device, a matching logic device, and an invalidation circuit in accordance with an embodiment of the present invention.

FIG. 1 illustrates a block diagram of a routing device for a PCI Express multi-port switch. Embodiments of the present invention are intended to function in a PCI Express switch that is enabled to sort base register addresses into an ascending or descending order. The use of sorted base register addresses for the purpose of rapid binary search switching in a PCI Express switch is described at length in the related and co-pending U.S. patent application Ser. No. 11/395,715, entitled "BINARY BASE ADDRESS SEARCH DEVICE AND METHOD" filed on 31 Mar. 2006, assigned to the assignee of the present application and incorporated by reference herein in its totality.

In FIG. 1, routing device 10 includes control logic circuitry 105, a base address sorting device 100, a base address matching logic device 103, and an limit check validation circuit 104. Routing device 10 is located at each port of the multi-port device to route a new communication packet into the correct port and thus to the correct external device. In the present embodiment, base address sorting device 100 includes base address matching logic device 103 that generates an output that is coupled to invalidation circuit 104. Control logic circuitry 105 are electrically connected to base address sorting device 100, base address matching logic device 103, and invalidation circuit 104 via internal links 106 for controlling the operations of these devices.

It is noted here that this discussion of embodiments of the present invention refers to use in a Peripheral Component Interface Express (PCIe) switch operating as part of a PCI Express bus. However, implementation of embodiments of the present invention is not limited to such applications.

PCI Express communications, it is noted, are switched-packet serial communications, meaning that information communicated in PCI Express is contained in a packet that includes a header having an address and, if data is being communicated, a payload. Because a header is added at a transaction layer in the PCI Express structure, a packet containing data and a header is commonly referred to as a transaction layer packet (TLP).

It is also noted that a "base address register," as referred to in this description, denotes a register that holds a base address, a limit address, and a port designation or name. Since a bus number can also be used to route some types of packets in a PCI Express serial switch, a bus number can be included in the contents of a base address register.

In one implementation of a PCI Express switch, an array of base address registers, one register for each other port in a switching device, is assigned to each port connected to a device with which the PCI Express switch communicates. At each port in a three-port switch, for example, there are three base address registers for a total of nine. In a large port-count switch, such as one having sixteen ports, for example, each port has an array of sixteen base address registers, for a total of 256. Each base address register contains a port name and the base and limit addresses assigned to external devices connected, either directly or indirectly, to its named port. The array of base address registers is encountered by the routing of an incoming PCI Express packet and the incoming packet is directed to the named port of the base address register whose address contents encompass the target address contained in the packet's header.

For a communication packet to be routed to a device by the switch, the address in the packet header must equal or lie between the base address and the limit address assigned to the port that is connected to the device. Each port in a PCI Express switch is connected to only one external device but an external device can be another switch or a bridge connected to additional devices.

A PCI Express switch, in this embodiment of the present invention, is able to dynamically reassign addresses and address ranges to the ports in the switch. One example of a reason to dynamically reassign addresses is a requirement by the operating system to increase a memory allocation, such as when a software application discovers a need for more memory space than was allocated to it at system start up.

Another example is a hot-switched occurrence, such as in the example of a One-GByte flash memory device being plugged into a USB port in place of a 256 MByte device, all while the associated computer is running. The base address and the limit address are, in this example, changed in the base address register associated with the USB port. The increased memory size in this example may require a limit address that is outside the range of addresses available above the existing base address. The base address must then be changed to an address with an associated address space sufficient to encompass the new allocation. Reassignment is accomplished with a configuration command packet.

Embodiments of the present invention are able to accommodate reassignment of addresses in the base address registers by the use of commands contained in configuration packets. A configuration packet, it is noted, is one of the various types of packets defined in PCI Express. The others include memory read/write, input/output read/write, and completions. Some types of packets that request an action, such as a base address reconfiguration, require a response that indicates completion of the action and a possible product of the action, such as data. A response can also be a system message.

It is noted here, again, that embodiments of the present invention enhance the performance of serial switches by enabling a rapid binary search of base addresses. The rapid binary search can be enabled by the sorting of base addresses into a descending or ascending order.

In one embodiment of the present invention, when a configuration command packet containing a new base address intended for a base address register associated with a port arrives at the PCI Express switch, base address sorting device 100 inserts the new address into the correct slot and sorts the array of base address registers in a predetermined order. During normal packet communication operations, base address matching logic device 103 uses the sorted list of base address registers to determine which external device is the intended target of each incoming packet containing a target address. A search for the proper base address register involves a comparison of the packet header target address and the base addresses contained in the base address registers. When the base address registers are sorted in descending order, for example, the first base address register encountered whose base address is smaller than the target address is the base address register of interest. This avoids a comparison of each incoming target address with every base address in every base address register.

Figure 2A:
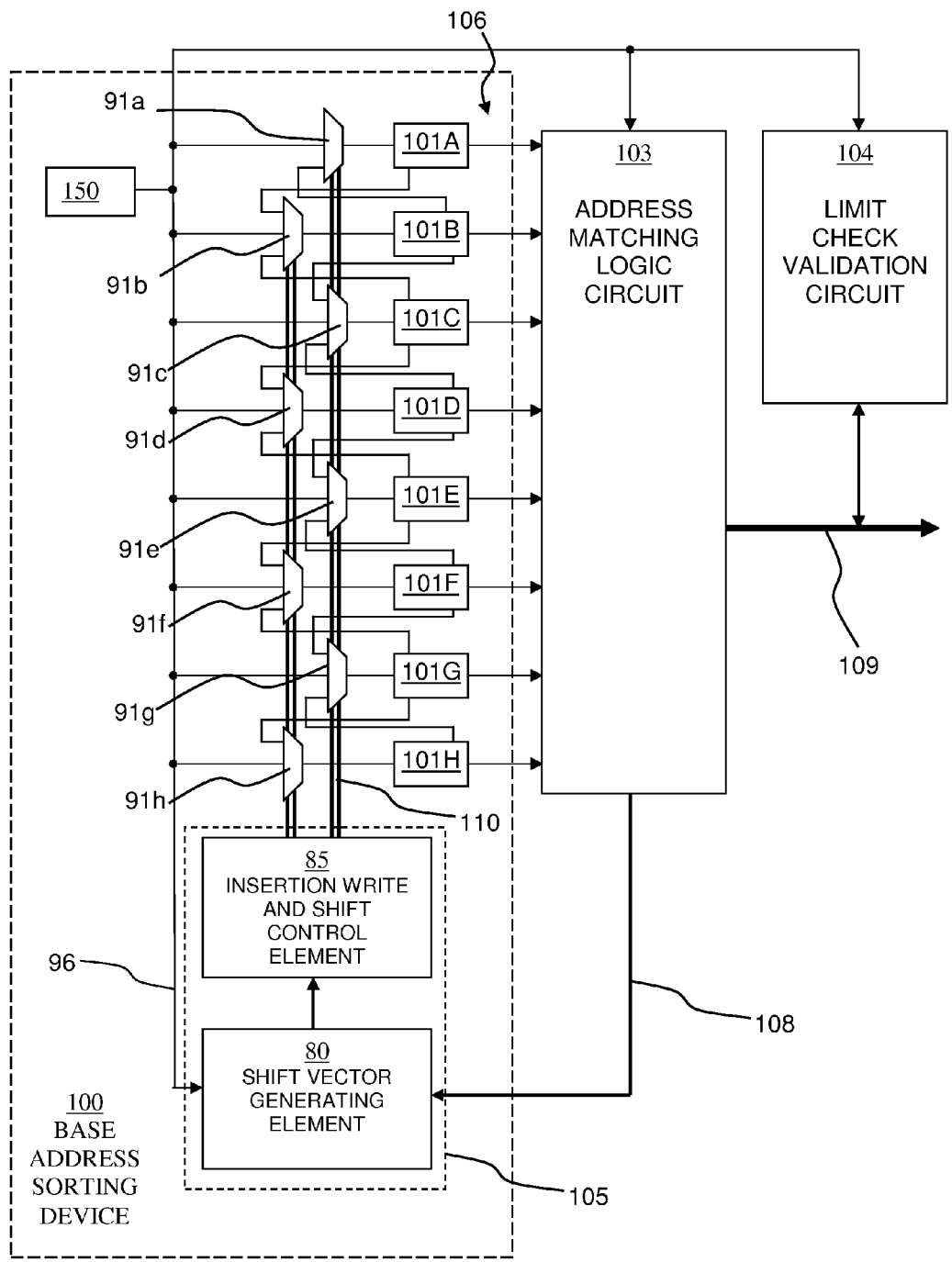
FIG. 2A illustrates a base address sorting device that includes a base address register array, a shift vector generating device, and an insertion write and shift device in accordance with an embodiment of the present invention.

Referring now to FIG. 2A, routing device 10 is shown that includes base address sorting device 100, address matching logic circuit 103, and invalidation circuit 104. Invalidation circuit 104, it is noted, is implemented here as a limit check validation circuit. Base address sorting device 100 includes, in this embodiment, register/buffer 150 which is electrically coupled to, and can be read by, multiplexers 91a-91h, by address matching logic circuit 103, as well as limit check validation circuit 104. Address matching logic circuit 103 is enabled to output 109 a port name or number associated with an address match found in a base address register in the array 101A-101H.

Continuing in reference to FIG. 2A, routing device 10 is illustrated as being implemented in a switching device with eight base address registers, in accordance with an embodiment of the present invention. A switching device with eight base address registers, it is noted, also has eight downstream ports.

In routing device 10, base address sorting device is shown as including the array of base address registers 101A-101H. In one embodiment, the array of base address registers 101A-101H is separate from base address sorting device 100.

Whether included or separate, the base address registers in array 101 are each enabled to be read into base address matching logic circuit 103. Base address matching logic circuit 103 can locate the base address register whose contents include a base address equal to or smaller than the target address for which a match is sought.

It is noted here that a base address register, as referred to in this description, can include a limit address and a port name or number. When a matching base address is determined by the base address matching logic circuit, the associated port name or number is sent to the switch core of the switching device. The port name or number is used to forward the communication packet to the correct port. It is also noted that matching addresses can be determined from limit addresses as well as base addresses. In this case, base address register contents can be sorted on limit addresses instead of base addresses.

It is noted here that a switching device, such as the exemplary device with eight downstream ports, also has an upstream port. However, the handling of communication packets that are targeted upstream of the switching device is different than those destined downstream and, in discussing the embodiments described here, base address registers for the upstream port are not discussed.

Still referring to FIG. 2A, base address sorting device 100 includes shift vector generating element 80 and insertion write and shift control element 85. Shift vector generating element 80 is shown, in this embodiment of the present invention, as receiving an output from address matching logic circuit 103. In this embodiment, matching address logic device 103, because it reads the contents of all the base address registers in the base address register array, is able to map the addresses and associated ports. An address map of the base address register array is then used by shift vector generating element 80 to generate a shift vector. A shift vector, in this embodiment, of the present invention is a digital word comprising two binary bits for each base address register in the array.

In the illustration of FIG. 2A, each base address register 101A-101H is shown at the output of an associated multiplexer, 91a-91h, respectively. In this embodiment, each multiplexer is a three-input multiplexer. In each implementation, each multiplexer 91a-91h takes its second input from the target address register/buffer 150, its first input from the next higher base address register, and its third input from the next lower register. It is noted again that "higher" and "lower", in this discussion, are logical concepts and are not meant to imply any physical relationship. For example, base address register 101F is "higher" than base address register 101G, but "lower" than base address register 101E. It is noted, however, that the topmost base address register 101A does not take input from a higher register or from base address register 101H. Similarly, bottommost base address register 101H does not take content from the highest base address register 101A. The respective multiplexers for the end base address registers are, in this embodiment, two-input multiplexers.

In one embodiment, base address register 101B takes its input from multiplexer 91b. Multiplexer 91b takes one input from the output of base address register 101A, the next higher register, one input from base address register 101C, the next lower register, and one input from target address register/buffer 150. Similarly, base address registers 101C-101G takes their inputs from multiplexer 91c-91g, respectively. Multiplexer 91a, however, takes its first input from register/buffer 150. The second input of multiplexer 91a is taken from base address register 101B, the next lower register. Multiplexers 91a and 91h are, as noted above, two input multiplexers.

In this fashion, the contents of each register are able to be written into an adjacent register, in either logical direction. Being able to shift the contents of the entire array of base address registers either one register higher or one register lower enables bidirectional shifting.

It is noted here that bidirectional shifting is accomplished here by multiplexers having three inputs in this embodiment of the present invention. In another embodiment, bidirectional shifting is accomplished by a different logical arrangement. However, in each embodiment, the content of each base address register is enabled to be shifted to a logically adjacent base address register, either logically higher or logically lower.

Each base address register 101A-101H of the array of base address registers contains a base address, a limit address and a port name or number. A base address contained in a base address register is an address of an external device. The limit address, if different from the base address, is the ending address of the external device. The difference between the limit address and the base address is the address range of the device. If a base address register contains a limit address numerically smaller than the limit address, the base address is considered to be an invalid address.

In the present embodiment, the content of the array of base address registers is sorted into a predetermined order. In this embodiment, the order is one of numerically decreasing base addresses so that the highest base address is contained the first base address registers 101A and the lowest base address is in bottom base address register 101H. However, it is understood that any predetermined order of the content array of base address registers is within the scope of the present invention.

Referring still to FIG. 2A, when a configuration command is received at the switching device, the new base and limit addresses, and the associated port number, are written into the register/buffer 150. Register/buffer 150 is read, in this embodiment of the present invention, by address matching logic circuit 103, limit check validation circuit 104, and by shift vector generating element 80 via connection 96. By comparing the new base address in register/buffer 150 against the contents of the base addresses, the shift vector generating element 80 is able to find an insertion point, the position where the new base address configuration is to reside in the array of base address registers.

Figure 2B:
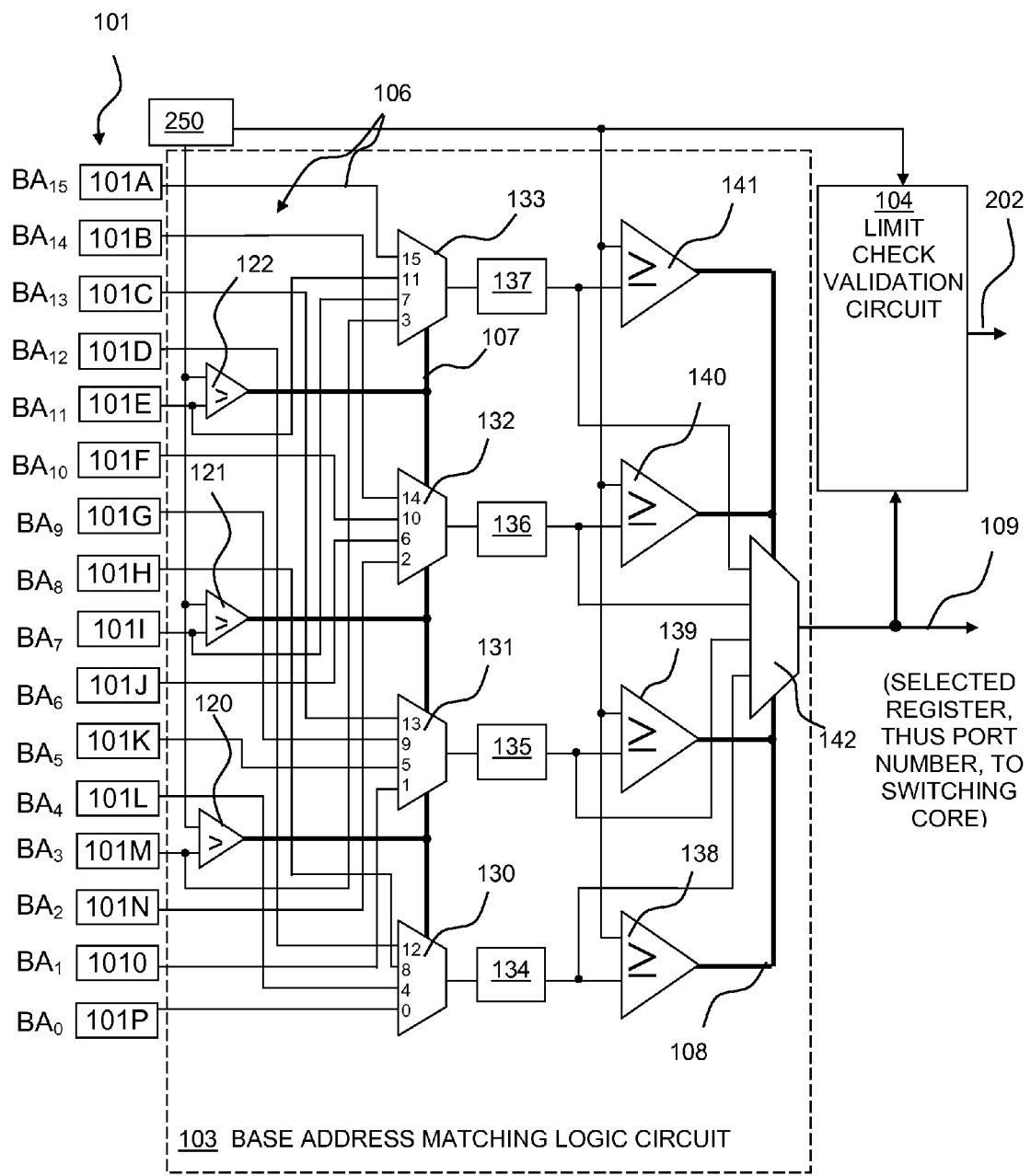
FIG. 2B illustrates a logic diagram of a base address matching logic element in a routing device in accordance with an embodiment of the present invention.

Now referring to FIG. 2B, base address matching logic circuit 103 and base address register array 101 are shown in a logical diagram. In this illustration, base address register array has sixteen base address registers 101A through 101P, containing base addresses $BA_{15}$ through $BA_0$, respectively. Base addresses $BA_{15}$ through $BA_0$ are sorted into the descending order shown by the action of base address sorting device 100 shown in FIG. 2A.

It is noted here that the switching device, here illustrated with sixteen base address registers in each port's routing device, is a seventeen port switch, though embodiments of the present invention can be implemented in switching devices with any number of ports. The switch is implemented here with one upstream port and sixteen downstream ports. Again, because a communication packet whose header target address indicates routing through the upstream port is handled differently from other packets, the base address register holding address and port information associated with the upstream port is not shown in base address register array 101. Base address register array, in this illustration, contains sorted base address and port information for downstream ports.

It is noted that the base address designations $BA_0$, $BA_1$, etc through $BA_{15}$ are used herein to denote base address register contents that are sorted on the numerical value of the base address. These designations do not imply any specific values for base addresses, limit addresses, port names, or bus numbers.

Similarly, the number of illustrated base address registers in base address register array 101 is shown solely for the purpose of illustration. The specific number of base address registers used in implementations of embodiments of the present invention is dependent on the number of ports in the applicable switching device.

In FIG. 2B, the location of $BA_{15}$, the largest numerical value base address, is shown in the topmost, logically, base address register. This is to illustrate that embodiments of the present invention use an array of base addresses that are sorted. In this embodiment, the sorting is into a logically descending order. In another embodiment, another sort order is used.

Again referring to FIG. 2B, base address register array 101 is shown connected 106 to base address matching logic circuit 103. Base address register array 101 includes 16 base address registers whose contents are sorted in the decreasing order of base address from top to bottom as $BA_{15}$, $BA_{14}$, $BA_{13}$, ..., $BA_1$, $BA_0$. Base address register array 101 is, in this embodiment of the present invention, divided into 4 intervals each having 4 base address registers. More particularly, the first interval includes base address registers 101P through 101M, containing base addresses $BA_0$ to $BA_3$. The second interval begins with base address register 101L holding $BA_4$ and ends with 101I holding $BA_7$. The third interval begins with base address register 101H holding $BA_8$ and ends with base address register 101E holding $BA_{11}$. The fourth interval begins with base address register 101D holding $BA_{12}$ and ends with base address register 101A holding $BA_{15}$.

A first-phase in base address matching logic circuit 103 comprises a first-phase set of comparators, 120, 121, and 122. Each comparator is enabled to compare the contents of a specific base address register with a target address in a communication packet header. In this embodiment, the target address is held in register 250. Each comparator in the first-phase set is connected to and has one of its inputs from register 250 and takes the other input from one of the base address registers in base address register array 101. The specific register to which each comparator is connected is based on a specific intersection interval.

In one embodiment of the present invention, as illustrated in FIG. 2B, the number of registers in the base address register array 101 is used to determine the intersection interval. In this embodiment, the interval, in number of registers included, is determined by the square root of the total number of ports in the switching device, which determines the number of registers in the base address register array. In this embodiment, $N^{(1/2)}$ is 4, where N is the number of registers in the base address register array. This results in 3 ($N^{(1/2)}-1$) first-phase comparators.

In another embodiment, however, the number of registers defining the intersection interval is the result of taking $Log_2(N)$. In further discussion herein, "logarithm" is used to designate any logarithmic function or root function used to determine the size of an intersection interval.

The topmost base address register in each interval, containing the numerically largest base address in the interval, is electrically coupled as one input to one of the first-phase comparators. More particularly, in the first interval base address register 101M, here having largest base address $BA_3$, is electrically connected to an input of first-phase comparator 120. In the second interval, base address register 101I, containing the interval's largest base address $BA_7$, is electrically connected to an input of first-phase comparator 121. In the third interval, base address register 101E, containing the interval's largest base address $BA_{11}$, is electrically connected to an input of first-phase comparator 122. Thus, the number of first-phase comparators is equal to the number of intervals minus 1. Accordingly, in general, there are $N^{(1/2)}-1$ first-phase comparators for array of base address registers 101, where, again, N equals the number of registers in the array.

It is noted here that embodiments of the present invention can be implemented in integrated circuits formed in silicon chips. The nature of such implementation lends some embodiments to seek optimal sizes of attendant features, such as multiplexers and comparators. In an embodiment discussed herein, one optimal size of a multiplexer can be found at four inputs. Hence, in one embodiment of the present invention, the number of selector phases and comparators can be derived from a root function that results in multiplexers of four inputs. In another embodiment, other functions can be used to derive a relationship between phases and features.

Register 250, containing the target address of interest, is electrically connected to the other input of each comparator 120-122. First-phase comparators 120, 121, and 122 compare the target address, in register 150, to base addresses $BA_3$, $BA_7$, and $BA_{11}$, respectively. The output of each first-phase comparator 120-122 depends on whether the target address in register 250 is greater numerically than the respective address. In the present embodiment, each first-phase comparator issues a "true" output if the target address is greater than the associated base address in each first-phase comparator's connected base address register. In another embodiment, the comparators issue a "false" output if the target address is not greater than the respective base address. Still other embodiments produce differing combinations of target address/base address relationships in relation to true/false outputs.

Still referring to FIG. 2B, the outputs of first-phase comparators 120-122 control the input selection of second-phase multiplexers 130, 131, 132, and 133. Multiplexers 130-133 select the inputs to second-phase comparators 138, 139, 140, and 141.

Second-phase multiplexers 130-133 are, in this embodiment of the present invention, four-input multiplexers. Each input to each of the second-phase multiplexers is connected to a single base address register, one in each of the intervals discussed above. Specifically, in this embodiment of the present invention, second-phase multiplexer 130 takes its inputs from base address register 101P in the bottom-most interval, base address register 101L in the next interval, base address register 101H in the interval after that, and from 101D in the topmost interval. The next second-phase multiplexer 131 takes its inputs from the next set of base address registers; specifically, base address register 101O in the bottom-most interval, base address register 101K in the next interval, base address register 101G in the interval after that, and from 101C in the topmost interval. The next second-phase multiplexer 132 takes its inputs from the next set of base address registers; specifically, base address register 101N in the bottom-most interval, base address register 101J in the next interval, base address register 101F in the interval after that, and from 101B in the topmost interval. The topmost second-phase multiplexer 132 takes its inputs from the next set of base address registers; specifically, base address register 101M in the bottom-most interval, base address register 101I in the next interval, base address register 101E in the interval after that, and from 101A in the topmost interval.

In FIG. 2B, the outputs of first-phase comparators 120-122 are shown connected to a bus connecting second-phase multiplexers 130-133. The outputs of first-phase comparators 120-122 determine which of the inputs each second-phase multiplexer uses to compare with the contents of register 150. In FIG. 2B, each second-phase multiplexer is shown with indications of which base address is available on each input. Second-phase multiplexer 130, for example, is shown with 0, 4, 8, and 12, indicating that base addresses $BA_0$, $BA_4$, $BA_8$, and $BA_{12}$, respectively, are the base addresses to be read on each input. Second-phase multiplexer 131 has 1, 5, 9, and 13 to indicate that base addresses $BA_1$, $BA_5$, $BA_9$, and $BA_{13}$, respectively, are the base addresses to be read on each input. Similarly, second-phase multiplexer 132 has 2, 6, 10, and 14 to indicate base addresses $BA_2$, $BA_6$, $BA_{10}$, and $BA_{14}$, and second-phase multiplexer 133 has 3, 7, 11, and 15 to indicate base addresses $BA_3$, $BA_7$, $BA_{11}$, and $BA_{15}$.

In an example of operation of the first-phase comparators and the second-phase multiplexers, a communication packet arrives at a port with a target address $TA_{NEW}$ in its header that is numerically between the base addresses represented by $BA_8$ and $BA_9$. $TA_{NEW}$ is written into buffer/register 250. Each first-phase comparator 120, 121, and 122, compares $TA_{NEW}$ with each first-phase comparator's respective specific register. $TA_{NEW}$ is larger than $BA_8$, thus it is also larger than $BA_3$ in base address register 101M connected to first-phase comparator 120. First-phase comparator 120, therefore, outputs a "true" indication. $TA_{NEW}$ is also larger than $BA_7$ in base address register 101I connected to first-phase comparator 121, so first-phase comparator 121 also outputs a "true" indication. However, $TA_{NEW}$ is smaller than $BA_9$, so it is also smaller than $BA_{11}$ in base address register 101E connected to first-phase comparator 122, so first-phase comparator 122 outputs a "false" indication.

The combination of outputs from the first-phase comparators determines which input is accepted by the second-phase multiplexers 130-133. In this embodiment of the present invention, a true, true, false output from the first-phase comparators indicates that, if a matching address is to be found for the new target address $TA_{NEW}$, it will be found in the interval above base address register 101I; 101H up to and including base address register 101E. If the first-phase comparator output had been "false, false, false", the first interval 101P-101M would have been indicated. If the output had been true, false, false, the second interval 101L-101I would have been indicated. If the output had been "true, true, true", the topmost interval, 101D-101A would have been indicated.

Because, in this example, the third interval 101H ($BA_8$)-101E ($BA_{11}$) is indicated, the output of first-phase comparators 120-122 causes the second-phase multiplexers 130-133 to read from the inputs connected to base address registers in the indicated interval. Second-phase multiplexer 130 reads from its third input connected to base address register 101H ($BA_8$), second-phase multiplexer 131 reads from its third input connected to base address register 101G ($BA_9$), second-phase multiplexer 132 reads from its third input connected to base address register 101F ($BA_{10}$), and second-phase multiplexer 133 reads from its third input connected to base address register 101E ($BA_{11}$). The contents of each of the third interval registers is written to the buffers 134-137, connected to each output of the second-phase multiplexers 130-133, respectively.

It is noted again that the numbers of second-phase multiplexers, the number of second-phase comparators and the number of first phase comparators are determined by the number of registers in the base address register array. In this embodiment of the present invention, the number of second-phase multiplexers is the nearest integer of the square root of the number of registers in the array, $N^{(1/2)}$, where N is the number of registers. For example, if there are eight registers in a nine-port switch, the number of second-phase multiplexers in this embodiment would be 3. In a 32 port switch, the number of second-phase multiplexers in this embodiment of the present invention would be 6. The number of first-phase comparators is $N^{(1/2)}-1$, in this embodiment. In a switching device with a port count producing a non-integer square root of N, the number is the next higher integer.

Referring again to FIG. 2B, the outputs of second-phase multiplexers 130-133 are connected to buffers 134-137, respectively. Each buffer 134-137 is enabled to be read as an input to second-phase comparators 138-141, respectively. The other input to each second-phase comparator is connected so as to read register 150 which contains, in the current example, new target address $TA_{NEW}$. Second-phase comparators 138-141, it is noted, output a true indication on either a greater-than-or-equal-to comparison.

Continuing the current example, second-phase comparator 138 compares $TA_{NEW}$ with base address $BA_8$. Second-phase comparator 139 compares $TA_{NEW}$ with base address $BA_9$, second-phase comparator 140 compares $TA_{NEW}$ with base address $BA_{10}$, and second-phase comparator 141 compares $TA_{NEW}$ with base address $BA_{11}$. $TA_{NEW}$ is larger than $BA_8$ but smaller than $BA_9$, $BA_{10}$, and $BA_{11}$. Therefore, second-phase comparator 138 outputs a true, but second-phase comparators 139-141 output false indications. As in the first phase, the outputs of second-phase comparators 138-141 control the input selection of multiplexer 142.

As shown in FIG. 2B, multiplexer 142 is also a four-input multiplexer, taking its inputs from the buffers 134-137 that contain the outputs of second-phase multiplexers 130-133. Again, the outputs of second-phase comparators 138-141 control the input selection of multiplexer 142.

In the present example, the "true, false, false, false" output of second-phase comparators 138-141 cause multiplexer 142 to accept the contents of register 134 as input. Register 134 contains the contents of base address register 101H, which include base address $BA_8$. In this way, the contents of base address register 101H are output by base address matching logic element 103. In addition to $BA_8$, the contents of base address register 101H include a limit address and a port name or number.

Continuing the present example in reference to FIG. 2B, the limit address contained in base address register 101H is compared to target address $TA_{NEW}$. If the target address and its associated address range, if any, are encompassed by the limit address contained in base address register 101H, and thus output by multiplexer 142, then the match is determined to be valid and the communication packet is forwarded to the port associated with the base address in base address register 101H. If the match is not determined to be valid, the packet is processed as an invalid packet. It is noted here that, in an embodiment implemented in PCI Express, such processing conforms to rules in the PCI Express specification.

If, in the continuing example, the indications output by second-phase comparators 138-141 had been different, a different input to multiplexer 142 would have been read for forwarding to the switch core. A "true, true, false, false" indication would have caused the multiplexer 142 to read from buffer 135. A true, true, true, false" indication would have caused the multiplexer 142 to read the contents of buffer 136, and a "true, true, true, true" would have caused the multiplexer to read buffer 137.

It is noted here that the selection, in this embodiment of the present invention, of the square root of the number of ports in the switching device results in a certain number of first-phase comparators, second-phase multiplexers, and second-phase comparators. Because multiplexers require less chip space, or real estate, than comparators, embodiments of the present invention are implemented in devices for which other choices produce differing numbers of such elements as may be optimal for the application. In a PCI Express switch having three downstream ports, for example, the next integer higher than $N^{(1/2)}$, (N=3) is 2. In the example discussed in reference to FIG. 2B, the selection of 2 as the interval integer would result in one first-phase comparator, two second-phase multiplexers and two second-phase comparators, as well as a base address sorting device and limit check validation, in lieu of six comparators if all base address registers were to be compared simultaneously.

However, in a large port-count switch, such as the exemplary switch with sixteen downstream ports, using $N^{(1/2)}$ (N=16) results in an interval size of four. This choice of interval size results in three first-phase comparators, four second-phase multiplexers, four second-phase comparators, and a base address sorting device in lieu of 32 comparators.

It is noted that other bases of reduction can be chosen for implementation of embodiments of the present invention, resulting in other numbers of elements of the base address matching device. For example, the integer closest to the square root of the number of registers can be utilized. In the case of a port with sixteen downstream ports, as is illustrated in FIG. 2A, the square root is 4, again resulting in three first-phase comparators and four second-phase comparators. In a switching device with 32 downstream ports, however, the integer that is next higher of the square root of about 5.66 is 6. An interval of 6 results in five first-phase comparators and six second-phase comparators.

Embodiments of the present invention are not limited, however, to a two-phase selection of base address matches. In one embodiment of the present invention, implemented in a switching device with 64 downstream ports, a three-phase matching address selection is implemented using a cube root function to establish the number of comparators in each phase. The number of registers in the intersection interval is the number of registers divided by the cube root of 64, 4. This results in three comparators in the first phase, four second-phase comparators, and four third-phase comparators.

Embodiments of the present invention encompass the scheme of base address sorting in order to enable multiphase comparisons. The number of devices employed; however, do not limit embodiments of the present invention.

Figure 3:
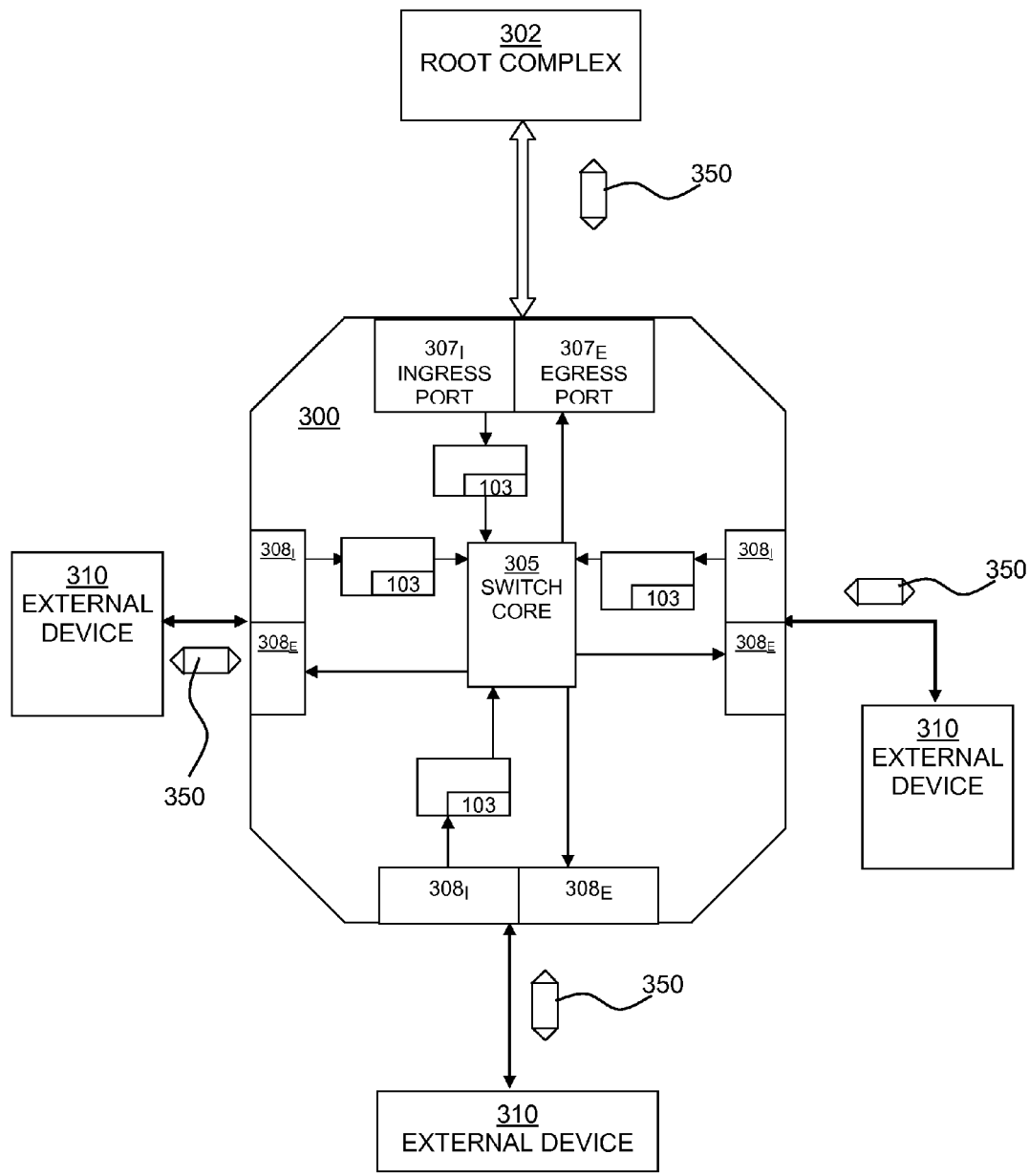
FIG. 3 illustrates a block diagram of a switching device in accordance with an embodiment of the present invention.

Now referring to FIG. 3, a block diagram of a switching device 300 is shown. In this embodiment of the present invention, the switching device uses routing device 10 of FIG. 1 at each port to facilitate communication of the external devices 310 connected to the switch. In another embodiment, routing device 305 is centrally implemented with switch core 305.

In one embodiment of the present invention, switching device 300 is a PCI Express switch. Switching device 300 employs routing device 10 that contains address matching logic device 103. Address matching logic device 103 is electrically connected to a switch core 305. Switching device 300 communicates with external devices 310 via PCI Express links 306. As discussed previously, the term PCI Express as used in the present invention includes devices, protocols, operations that conform to the requirements of the PCI Express Base Specification. The term "PCI Express Base Specification", as used in the present application, includes all PCI Express standards, including but not limited to PCI Express Standard versions 1.0, 1.0a, and 1.1 published by PCI Signal Interest Group (PCI-SIG).

In the present embodiment, as illustrated in FIG. 3, switching device 300 is implemented as a four port switch. In another embodiment, switching device 300 includes sixteen or more ports enabled to communicate with external devices 310. In one embodiment, switching device 300 includes 15 ports downstream ports 308 and an upstream port 307. Upstream port 307 further includes ingress terminal 307I and egress terminal 307E. Ingress terminal 307I is an input terminal for receiving an incoming PCI Express communication packet from root complex 302. Egress terminal 307E is an upstream output port for sending out a communication packet routed through switching device 300 to root complex 302 or to another switching device located upstream.

Downstream ports 308 each include an ingress terminal 308I and an egress terminal 308E that are electrically coupled to switch core 305. Downstream ingress terminal 308I is used to receive communication packet 350 from external devices 310 and downstream egress terminals 308E send out communication packets to external devices 310. It is noted that, when external devices 310 are electrically connected to switching device 300, external devices 310 can send and receive PCI Express packets, through switching device 300 over PCI Express links 306, to each other without entailing upstream, root complex, time. At upstream port 307, the input terminal of routing device 10 is electrically connected to upstream ingress terminal 307I and the output terminal of routing device 10 is electrically connected to switch core 305. The output of the switch is electrically connected to egress terminal 307E of upstream port 307. Similarly, at each downstream port 308, the input terminal of routing device 10 is electrically connected to downstream ingress terminal 308I and the output terminal of routing device 10 is electrically connected to a switch of switch core 305. The output of that switch is electrically connected to egress terminal 308E of downstream port 308.

In one embodiment of the present invention, routing device 10, and its array of base address registers and control logic, is replicated at every port in switching device 300. In an alternative embodiment, however, a single implementation of the elements of routing device 10 is located with the switch core 305. In another embodiment, more than one implementation of the elements of routing device 10 is implemented, though not at every port in the switching device.

Referring still to FIG. 3, a communication packet 350 may be received at switching device 300 at upstream port 307 or at any of downstream ports 308. In the present embodiment, a communication packet 350 can be a data or other packet that is in compliance with the PCI Express standard. External devices 310 can be PCI Express devices or bridges to other types of devices. Upon receiving communication packet 350, control logic circuitry 105 determines whether the target address contained in communication packet 350 falls within the address range contained in any of the base address registers in the array of base address registers 101. If the target address contained in communication packet 350 is within the range of array of any of the base address registers 101, switching device 300 will forward the communication packet 350 to the port named in the base address register whose address range encompasses the target address.

In the present embodiment, switching device 300 is a single Integrated Circuit (IC) device that is implemented in a single semiconductor chip on which routing functions and logic of switching device 300 are implemented. This includes registers, comparators multiplexers and connection links described above. In practice, switching device 300 with base address matching logic element 103 can be implemented as a chipset which is a device coupled to a Central Processing Unit (CPU) to perform the desired system functionality. In another embodiment, switching device 300 can be implemented on an Application Specific Integrated Circuit (ASIC).

Figure 4:
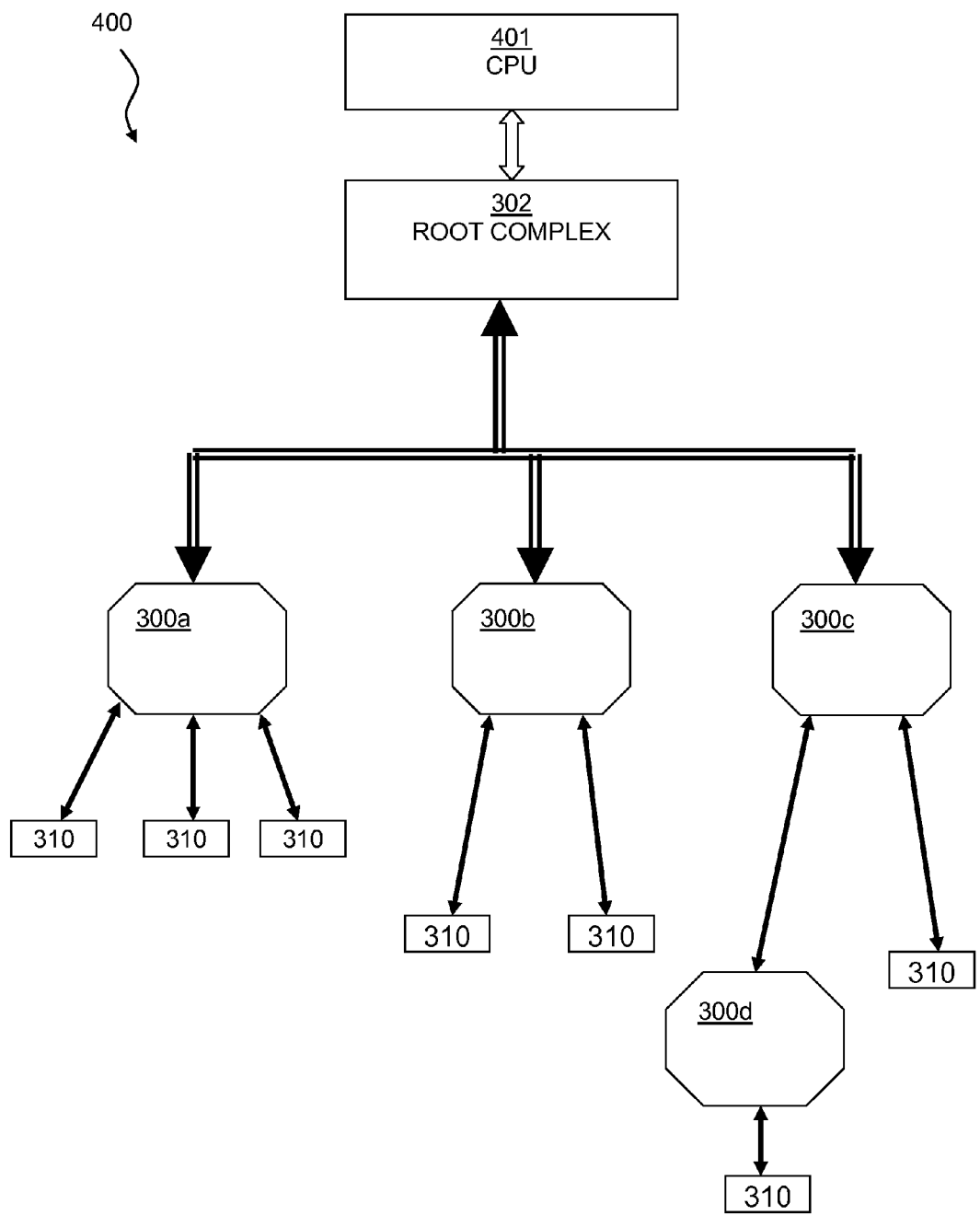
FIG. 4 illustrates a schematic diagram of a PCI Express system that includes the switching device of FIG. 3 and external devices in accordance with one embodiment of the present invention.

Now referring to FIG. 4, a schematic diagram of a typical PCI Express system 400 is shown that uses switching device 300 to connect external devices 310 with root complex 302 and with each other. Switching device 300 includes a routing device 10 that contains base address sorting device 100. In the embodiment that is shown in FIG. 4, switching device 300 with routing device 10 is implemented in a PCI Express system 400. PCI Express system 400 is a communication system which is typically found in computing system that includes a Central Processing Unit (CPU) 401, a root complex 302, switching device 300 and one or more external devices 310.

The elements of PCI Express system 400 interconnected by PCI Express link 306 are the root complex 302, the switching device 300, and the external devices 310. CPU 401 is electronically connected to root complex 302 but the link between them is not, in this embodiment, a PCI Express link. The heart of PCI Express system 400 is root complex 302. Root complex 302 is connected to PCI Express switching device 300 by PCI Express link 306. External devices 310 communicate to root complex 302, and thus CPU 401, via switching device 300. In PCI Express system 400, external devices 310 can independently communicate peer-to-peer with each other directly via switching device 300. PCI Express system 400 uses communication packets 350 to communicate to root complex 302, switching device 300, and external devices 310 connected thereto. Communication packets can be generated by the root complex 302, switching device 300, or external devices 310.

Referring further to FIG. 4, the controller of PCI Express communications in system 400 is either CPU 401 or root complex 302. In the point-to-point diagram shown in FIG. 4, CPU 401 can communicate to any of the external devices 310, even if the communication pathway between CPU 401 and an external device 310 includes PCI Express serial switch 300c and PCI Express serial switch 300d in the sequential relationship shown. CPU 401 can open up communication with that external device 310 via switching devices 300. CPU 401, through root complex 302, controls the operations of switching devices 300 and the PCI Express link 306 with external devices 310. Root complex 302 detects and initializes external devices 310, and controls PCI Express link 306 by default. Root complex 302 can retrieve information from external device 310. Upon receiving an instruction from root complex 302, switching devices 300 can route communications directly between external devices 310. External devices 310 can communicate with one another independently and in a peer-to-peer fashion without a master-slave control of either switching devices 300 or root complex 302.

External devices 310, it is noted, can be either endpoint devices or other switching devices such as switching devices 300, such as shown by switching devices 300c and 300d. Endpoint devices can be, for example, printers, digital cameras, add-in cards, USB memory sticks, etc. Other switching devices 300 are often not the end users of communication packets 350 sent to them; they forward the packets to other endpoint devices 310 to which they are connected. Each external device 310 is assigned to a base address and a limit address. These base addresses are loaded and stored in a global address map and are retrieved as needed by root complex 302 or CPU 401. Root complex 302 then maps these base addresses to the arrays of base address registers 101. The base address contained in each base address register in the arrays of base address registers 101 defines the starting point and memory addresses that each external device 310 has been allocated in the global address map.

Referring again to FIG. 4, the purpose of PCI Express link 306 is to connect external devices 310 to root complex 302 so that the CPU 401, via root complex 302, can communicate with them. Each PCI Express link 306 is composed of one or more lanes, and each lane is capable of transmitting packets in both directions at once. This full-duplex communication is possible because each lane is itself composed of one pair of signals: send and receive.

Referring again to FIG. 4, upon power-up and enumeration process, the operating system, via root complex 302, interrogates the entire PCI Express system 400 by traversing through system topology and locates all external devices 310 that are connected to the switching device 300. After the configuration process is complete, each receiver interface of each external device 310 is prepared to monitor the integrity of new communication packet 350. A transaction layer packet (TLP) can move from one PCI Express link 306 to another PCI Express link 306, using routing information contained in its header.

Referring again to FIG. 4, as a new communication packet 350, in the form of a transaction layer packet (TLP), arrives at ports 307 or 308, switching device 300 checks for errors then determines whether to accept the traffic and use it internally, forward the traffic to the appropriate port 308, or reject the traffic because switching device 300 is neither the intended target nor an interface to it.

Figure 5:
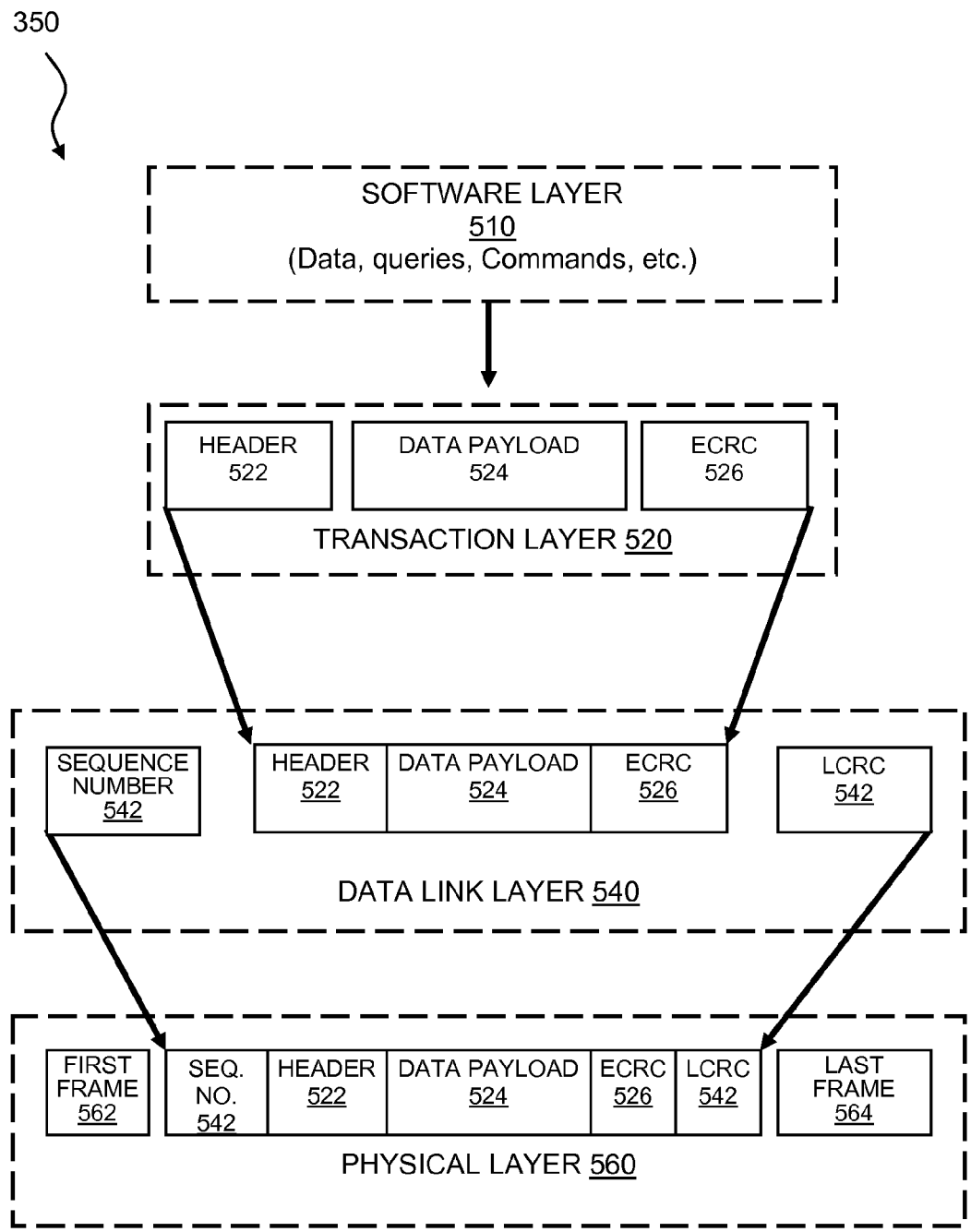
FIG. 5 illustrates a conceptual parsing of a communication packet in a PCI Express system in accordance with an embodiment of the present invention.

Referring now to FIG. 5, different abstract layers of a typical PCI Express communication packet 350 are illustrated. Communication packet 350 can include data, commands, a query or other communication that a software function, software layer 510 in this illustration, intends for some device in the system. A configuration command, reassigning base and limit addresses, it is noted, can be one type of communication packet 350. Data becomes the payload 524 of a data packet. In a configuration command, the payload is a new address or set of addresses for reconfiguration of a base address register in switching device 300.

Referring still to FIG. 5, a transaction layer 520, the operating system for example, applies a header 522 and, possibly, a footer 526, to the data payload 524. Header 522 includes a target address which can be a device address, a port name, or a bus number in the system. In the example of a configuration command packet, the target address is an address internal to switching device 400. Footer 526 is often an End-to-end Cycle Redundancy Checking (ECRC) sequence.

Transaction layer 520 ensures that communication packet 350 is properly routed to its intended destination and that it arrives intact. In the example of a communication packet 350 destined for an external device 310, transaction layer 520 ensures the integrity of communication packet 350 and that it passes intact through switching device 300.

Data link layer 540 is, in this embodiment, the point-to-point function, such as is implemented by switching device 300. The data link layer adds sequence number 542 and a Link Cycle Redundancy Check (LCRC) 546 to the communications packet. Physical layer 560 represents the transmission medium which is responsible for actually transmitting and receiving communication packet 350 across PCI Express link 306. Physical layer 560 adds a first frame 562 and a last frame 564 in addition to sequence number 542, LCRC 546, header 522, data payload 524, and ECRC 526. Link cyclical redundancy check (LCRC) 546 ensures integrity of packet 350 across PCI Express link 306.

It is noted that a switching device in a PCI Express environment can be connected with one or more switching devices at its downstream ports, as shown in FIG. 4. If, in this example, the target address of a communication packet 350 indicates a downstream external device and switching device 350 is not the recipient, switching device 300 forwards communication packet 350 to the downstream external device 310. A base address register associated with a downstream switch, it is noted, contains a base address and a limit address fully encompassing the ranges of addresses represented in the base address registers of the downstream switch.

If switching device 300 is not correctly in the path of communication packet 350, the packet is returned to the upstream egress terminal 307E subject to the rules for ordering and flow control for that port. If the target address contained in the header 522 of transaction layer packet 520 does not belong to the range of base addresses of upstream port 407, switching device 400 performs further comparisons and rejects the packet as an Unsupported Request (UR). Thus, transaction layer 540 and other layers carry information and ensure data integrity of communication packet 350 that is necessary to perform the routing process of routing device 10 in switching device 300.

In one embodiment of the present invention where PCI Express system 300 has more than one switching device 300 connected to it, to facilitate communications between two external devices 310 in different switching devices 300, communication packet 350 traverses from the originating external device 310, connected to one switching device 300 all the way up to the lowest common switch point. New communication packet 350 is then traverses down to the destination external device 310. When the source and target reside on different segments of PCI Express link 306, communication packet 350 must be routed up toward root complex 302 to the segment of PCI Express link 306 where the base address ranges of the source and the target external devices 310 intersect, and then routed down to the target external device 310. As a result, address based routing exploits the shortest paths that exist in a switched-packet interconnect fabric.

Figure 6:
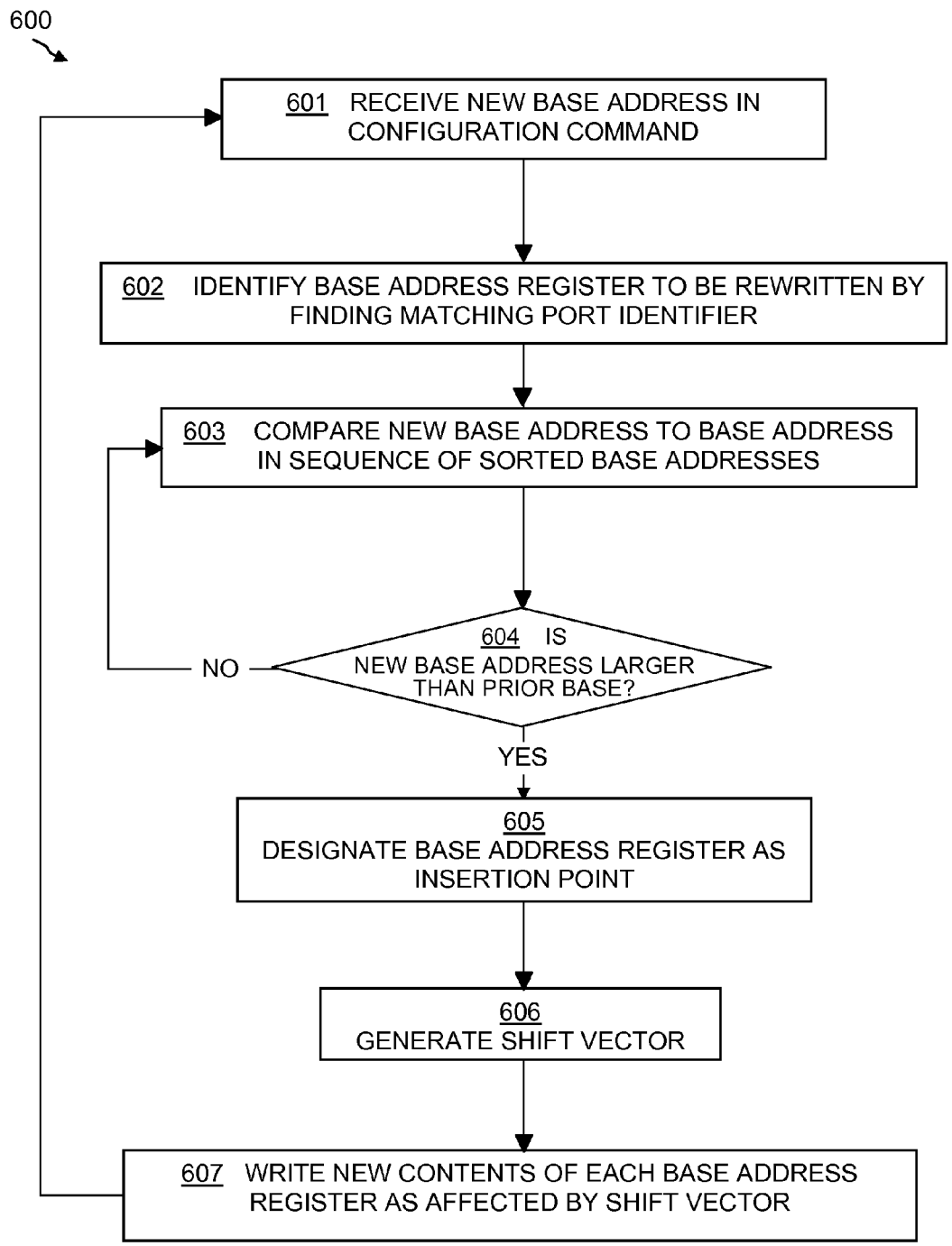
FIG. 6 illustrates a flow diagram of a method for base address sorting in a switching device in accordance with an embodiment of the present invention.

FIG. 6 illustrates a method for rapid base address reconfiguration and sorting in accordance with an embodiment of the present invention. Method 600, implemented by routing device 10 in switching device 300, begins by receiving 601 a configuration command in a communication packet containing a new configuration for a port in switching device 300. The configuration command, in this embodiment, contains a base address, a limit address, and a port or bus identifier.

A new configuration can be initiated by an operating system (OS) or by another device. In this embodiment, the OS has assigned a new address range to a port. This could be in order to accommodate a newly plugged in piece of equipment, such as a USB device to a USB bridge connected to the port, for example. The new address range may be one that exceeds the range available between the port's existing base address and the next higher base address. In order to accommodate the necessary address range, the port must be assigned a new base address. Hence, the new contents of the new configuration command.

Referring still to FIG. 6, the base address register containing the prior configuration of the port to be reconfigured is identified, 602. Port, or bus, identifiers in the prior configuration are found in each base address register.

At step 603, the new configuration base address is compared to each of the prior base addresses in the array of base address registers. The comparison at 603 does not need to consider the port identity because the comparison at 603 is done in order to find an insertion point for the new configuration base address that preserves the pre-existing sorted order of the base addresses in the base addresses. Because the existing configuration base addresses are in a pre-defined order, descending order in this embodiment, the comparison starts with the numerically largest base address and works logically down.

In one embodiment of the present invention, the address matching logic circuit 103 is used to implement the comparison and matching of the new configuration base address to the base addresses in the array of base address registers. In another embodiment, the base address register array is enabled to perform its own comparison.

If, at 604, the prior configuration base address is larger than the new configuration base address, the comparison moves to the next lower base address register. It is noted here that "higher", and "lower" are logical concepts and do not define a physical relationship of registers.

If, at 604, the prior configuration is smaller than the new configuration base address, the base address register containing the prior configuration base address is designated 605 as the insertion point for the new configuration information. The contents of the base address registers that lie between the insertion point and the base address register containing the prior configuration for the port being re-configured are then required to be shifted either up or down, logically, in the array of base address registers in order to preserve the sorted order. A shift vector generator (80 in FIG. 2A) generates the shift vector 606 in accordance with the results of steps 602 and 605.

Still referring to FIG. 6, the instructions for the shifting and inserting of base address register content are written into a shift vector at 606. In this embodiment of the present invention, a shift vector is a series of bit pairs that inform the action of the base address registers when a new configuration is written. There are four possible actions. "00" instructs the base address to recycle its prior contents, making no change. "01", in this embodiment, instructs the base address register to take on the content of the configuration command, an "insertion". "10" instructs the base address register to take on the content of the next lower register, a "shift up". "11" instructs the base address register to take on the content of the next higher base address register, a "shift down".

Referring still to FIG. 6, at step 607, the content of the entire array of base address registers is written in reference to the shift vector. A base address register can, under direction of the shift vector, take its content from the buffer register ("01"), from the next higher register ("11"), the next lower register ("10"), or from itself ("00"). The new configuration of the base address registers contains the new assigned base and limit addresses and the new base address is sorted into the pre-determined order previously established without interruption of the normal function of the switching device.

Referring now to FIGS. 7A through 7D, an example is illustrated of the reconfiguration of a new base address and port assignment into a stack of base address registers in a switching device in accordance with an embodiment of the present invention. In this example, the serial switch 300, an example of which is shown in FIG. 3, is implemented as a nine-port switch in which the upstream port is named port 0 and the eight downstream ports are named ports 1 through 8. In this illustration, only the downstream port base address registers are illustrated. The upstream port 0, in this example, is assigned the entire range of addresses that are accommodated within the switch, in this case 1 through 18. If any of the downstream ports receive a packet whose target address lies outside the range of 1-18, the packet is routed to the upstream port 0. Any packet with a target address within the range of 1-18 must be routed to one of the eight downstream ports or it is an invalid target address. In this embodiment of the present invention, the base address associated with the upstream port is not sorted with those of the downstream ports.

It is noted that addresses used in this illustration are used only for illustrative purposes. Actual addresses can be many digits in length. In one embodiment, the twenty least significant digits of an address are not considered in matching or sorting processes, meaning that a minimum address range is one Megabyte (MB). The addresses of "9", "10", "11", etc., are used for brevity and clarity in this description.

Figure 7A:
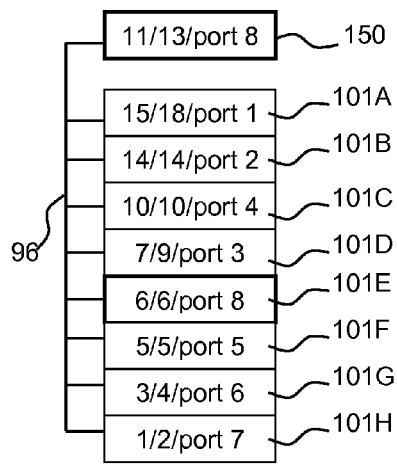
FIGS. 7A through 7D illustrate an example of base address reconfiguration and sorting in accordance with an embodiment of the present invention.

In FIG. 7A, a new configuration for port 8 is received at serial switch 300. The contents of the new configuration command have been copied to register/buffer 150. As shown in this illustration, the new configuration of port 8 is for a base address of 11, a limit address of 13, and the port name 8.

Still referring to FIG. 7A, the base address registers 101A through 101H are shown with their contents arranged with the base addresses in descending order. It is noted that address assignments can be such that port numbers do not necessarily follow in descending order though their associated base addresses do. The base address registers are shown with base address register 101A holding port 1's assigned base address of 15 and limit address of 18 ("15/18/port 1"). Base address register 101B is shown with port 2's base address of 14 ("14/14/port 2"). Port 2, in this example, is shown with a limit address identical to port 2's base address. A limit address, it is noted, is the same as a base address if the port is connected to a device having a single address.

Continuing further in reference to FIG. 7A, base address register 101C is shown with port 4's base address of 10 and the same limit address of 10 ("10/10/port 4"). Base address register 101D is shown with port 3's base address of 7 and a limit address of 9 ("7/9/port 3"). Base address register 101E holds the existing configuration for port 8 ("6/6/port 8"), while base address registers 101F through 101H hold the configurations for ports 5, 6, and 7: "5/5/port 5", "3/4/port 6", and "1/2/port 7", respectively.

In this example, the new configuration is initiated by the operating system (OS). The OS has assigned a new address range to port 8. This could be in order to accommodate a newly plugged in piece of equipment, such as a USB device to a USB bridge connected to port 8, for example. The new address range exceeds the range available between port 8's existing base address of 6 and the next higher base address, that of port 3's 7. In order to accommodate the necessary address range, port 8 must be assigned a new base address, in this case, 11. Hence the new contents of the new configuration command as contained in register/buffer 150, "11/13/port 8". Continuing in reference to FIG. 7A, because the new configuration is for port 8, the base address register containing the existing configuration for port 8 is identified for replacement (step 602). Base address register 101E contains the existing configuration for port 8.

Figure 7B:
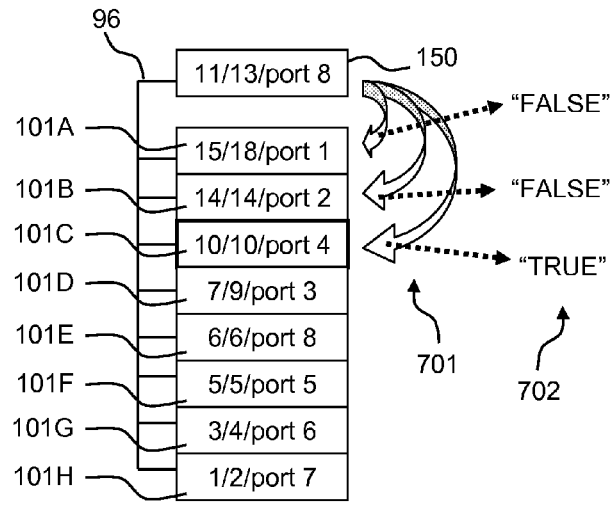

In FIG. 7B, the base address of the register/buffer 150, containing the contents of new configuration ("11/13/port 8"), is compared with the contents of the base address registers. In this embodiment of the present invention, the comparison is done sequentially in descending order 701 of the existing base addresses in the base address registers.

In the comparison, shown at steps 603 and 604 in FIG. 6, the new configuration base address is compared to the base address of top base address register 101A. Since 15 is larger than 12, the comparison outputs a "false" 702 and steps to the next lower base address register 101B containing the next lower assigned base address.

The next comparison in FIG. 7B is with the next base address, "14" of port 2. Again, the present base address of 14 is larger than the new configuration base address of 11. Again, the comparison outputs a "false" 702.

In FIG. 7B, the next comparison is with the next base address, "10" of port 4. Port 4's base address of 10 is smaller than the 11 of the new configuration. The comparison here outputs a "true" indication. The base address register 101B containing "10" as a base address is designated as the insertion point base address register (step 605).

Figure 7C:
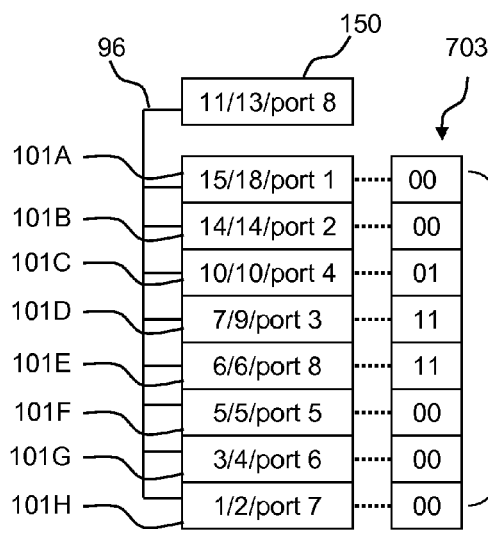
Figure 7D:
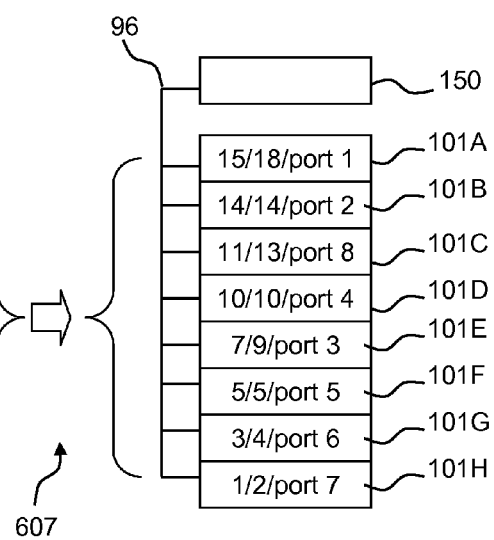

Now referring to FIG. 7C, the base address register 101E containing the prior configuration for the port being reconfigured ("6/6/port 8") is found (step 605). In one embodiment of the present invention, the old configuration is deleted. In another configuration, the prior configuration is overwritten when the base address register contents are shifted. FIG. 7D illustrates overwriting of the prior configuration.

Referring still to FIG. 7C, a shift vector 703 is generated (step 606). The shift vector is generated by shift vector generating element 80 in FIG. 2A. In this embodiment of the present invention, the shift vector is a multi-bit word which has two bits for each base address register. "00", a bit pair instructing an associated base address register to recycle, or keep, its current contents, is written for base address registers 101A, 101B, 101F, 101G, and 101H. "01" is a bit pair instructing an associated base address register to take its content from the buffer register 150. Because base address register 101C is designated as the insertion point, it is assigned the shift vector bit pair "01".

Also in this embodiment of the present invention, "11" is a bit pair instructing an associated base address register to take its content from the next logically higher base address register. The prior content of base address register 101C, the configuration for port 4 ("10/10/port 4") is not being deleted but shifted to the next lower base address register, 101D, and the content of base address register 101E, the prior configuration for port 8, is being replaced, thus leaving room for the content from the next higher base address register, 101D. Since both base address registers 101D and 101E are taking new content from their respective next higher base address registers, they are each assigned "11" as their associated shift vector bit pair.

Though not used in this example, "10" is also available as a bit pair in the shift vector. "10" instructs the associated base address register to take its content from the next lower base address register.

Continuing in reference to FIG. 7C, the newly written shift vector 703 is "0000011111000000". Under the direction of the generated shift vector 703, the array of base address registers is written with the new configuration. With the implementation of the three-input multiplexers described in reference to FIG. 2A, the new configuration of the entire base address array 101 is written in a single system clock cycle, step 607.

FIG. 7D illustrates the new configuration of the base address array 101. Base address registers 101A and 101B contain their prior content, "15/18/port 1" and "14/14/port 2", respectively. Base address register 101C contains the new configuration for port 8, "11/13/port 8". Base address registers 101D and 101E contain "10/10/port 4" and "7/9/port 3", respectively, the prior content of base address registers 101C and 101D, respectively. Base address registers 101F, 101G, and 101H contain their prior content, "5/5/port 5", "3/4/port 6" and "1/2/port 7", respectively. Buffer/register 150 is ready to receive a new configuration command as necessary.

A base address sorting device in a switching device has been disclosed that includes an array of base address registers in which each base address register contains a base address, an address shifting device; and a control logic element electrically coupled to the array of base address registers and operable, upon receiving a configuration command comprising a new base address, to implement a method for reconfiguring the contents of the array of base address registers. The method includes determining an insertion point base address register in the array of base address registers into which to write the new base address, shifting the contents of one or more base address registers array to other base address registers to preserve the sorted order, and shifting the contents of the configuration command into the insertion point base address register. The inserting results in preserving the pre-determined order of the register array content.

By using a shift vector as described herein, the method and apparatus of the present invention allow for quickly and accurately inserting a new configuration for a base address register into an array of base address registers, in a pre-determined sorted order. Also, the shift vector of the present invention allows for the use of a relatively small number of comparators and multiplexers, resulting in the saving of considerable semiconductor chip space and power consumption.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

We claim:

1. A base address sorting device in a switching device, comprising:
    an array of base address registers sorted into a pre-existing order, each base address register in said array of base address registers containing a base address, wherein each of the base addresses contained in said base address registers designates an identifying address of a specific external device;
    a hardware implemented control logic element electrically coupled to said array of base address registers and operable upon receiving a configuration command comprising a new base address to reconfigure the contents of said array of base address registers by determining an insertion point base address register in said array of base address registers into which to write said new base address of said configuration command which will preserve the pre-existing sorted order of the contents of the array of base address registers, wherein the insertion point base address register is determined by:
        dividing the array of base address registers into a plurality of base address intervals;
        identifying the base address interval in which the new base address belongs by using a first plurality of comparators to simultaneously compare the new base address to one of the base address registers in each of the plurality of base address intervals; and
        after the base address interval has been identified in which the new base address belongs, determining the insertion point base address register by using a second plurality of comparators to simultaneously compare the new base address to each of the base address registers in the identified base address interval;
    generating a shift vector to direct the shifting of the base addresses of one or more base address registers in said array of base address registers to preserve the pre-existing sorted order of the contents of the array of base address registers, wherein the shift vector is a multi-bit digital word comprising directions for each base address register in said array of base address registers to either; make no change to its content, replace its content with the content from the configuration command, replace its content with the content of a next lower base address register or replace its content with the content of the next higher register, inserting said new base address into said insertion point base address register and shifting the contents of the one or more base address registers in said array of base address registers in accordance with the shift vector, wherein said inserting and said shifting of the contents of the one or more base address registers to preserve the pre-existing sorted order is accomplished in a single clock cycle.

2. The base address sorting device described in claim 1, further comprising a buffer for storing said new base address and electrically coupled to said array of base address registers.

3. The base address sorting device described in claim 1, wherein the control logic element further comprises an insertion write and shift control element operable to insert said new base address into said insertion point base address register and to shift the contents of the one or more base address registers in said array of base address registers in accordance with the shift vector.

4. The base address sorting device described in claim 1 wherein the control logic element further comprises a shift vector generating element operable to generate the shift vector to direct the shifting of the base addresses of one or more base address registers in said array of base address registers to preserve the pre-existing sorted order of the contents of the array of base address registers, wherein the shift vector comprises directions for each register in said array of base address registers to either; make no change to its content, replace its content with the content from the configuration command, replace its content with the content of a next lower register or replace its content with the content of the next higher register.

5. The base address sorting device described in claim 1, wherein said shift vector is a digital word comprising two binary bits for each base address register in said array of base address registers.

6. The base address sorting device described in claim 1, further comprising an array of multiplexers wherein each multiplexer in said array of multiplexers is electrically coupled so as to provide the input to a base address register in said array of base address registers.

7. The base address sorting device described in claim 6, wherein each multiplexer in said array of multiplexers is electrically coupled so as to take an input from a register/buffer whose contents comprise a new base address.

8. The base address sorting device described in claim 6, wherein each multiplexer in said array of multiplexers is electrically coupled so as to take an input from a base address register logically located adjacent to said base address register to which said multiplexer provides the input.

9. The base address sorting device described in claim 8, wherein each multiplexer in said array of multiplexers is electrically coupled so as to take an input from a base address register logically located ahead of said base address register to which said multiplexer provides the input and to take an input from a base address register logically located behind said base address register to which said multiplexer provides the input.

10. The base address sorting device described in claim 9, wherein the selection of an input to each multiplexer in said array of multiplexers is directed by said control logic element.

11. The base address sorting device of claim 1 wherein said pre-existing sorted order is a descending order of said base address content of said array of base address registers.

12. A switching device for switching a communication packet, comprising:
   a switch core enabled to direct the routing of said communication packet;
   a plurality of ports, each of said ports being electronically coupled to said switch core and to an external electronic device, each of said ports having a base address and a port name; and
   a base address sorting device, comprising:
      an array of base address registers sorted into a pre-existing order, each base address register in said array of base address registers containing a base address, wherein each of the base addresses contained in said base address registers designates an identifying address of a specific external device, and wherein each of said ports is enabled to receive said communication packet and wherein said switch core is enabled to direct said communication packet to one of said ports by directing said packet to the port associated with an address in the array of base address registers; and
      a hardware implemented control logic element electrically coupled to said array of base address registers and operable upon receiving a configuration command comprising a new base address to reconfigure the contents of said array of base address registers by determining an insertion point base address register in said array of base address registers into which to write said new base address of said configuration command which will preserve the pre-existing sorted order of the contents of the array of base address registers, wherein the insertion point base address register is determined by dividing the array of base address registers into a plurality of base address intervals, identifying the base address interval of the plurality of base address intervals in which the new base address belongs by using a first plurality of comparators to simultaneously compare the new base address to one of the base address registers in each of the plurality of base address intervals, and after the base address interval has been identified in which the new base address belongs, determining the insertion point base address register by using a second plurality of comparators to simultaneously compare the new base address to each of the base address registers in the identified base address interval, generating a shift vector to direct the shifting of the base addresses of one or more base address registers in said array of base address registers to preserve the pre-existing sorted order of the contents of the array of base address registers, wherein the shift vector is a multi-bit digital word comprising directions for each base address register in said array of base address registers to either; make no change to its content, replace its content with the content from the configuration command, replace its content with the content of a next lower base address register or replace its content with the content of the next higher base address register, inserting said new base address into said insertion point base address register and shifting the contents of the one or more base address registers in said array of base address registers in accordance with the shift vector, wherein said inserting and said shifting of the contents of the one or more base address registers to preserve the pre-existing sorted order is accomplished in a single clock cycle.

13. The switching device described in claim 12, wherein said communication packet is in conformance with a third generation input/output system that implements a serial, switched-packet, point-to-point communication standard at the system level.

14. The switching device described in claim 12 further comprising a plurality of said base address sorting devices, wherein each of said ports comprises one of said plurality of base address sorting devices that includes an array of base address registers having the base addresses and associated port names for all of said ports in said switching device.

15. The switching device described in claim 12 wherein said switching device is a serial switch.

16. A method for reconfiguring a base address in an array of base address registers in a switching device, wherein said array of base address registers are sorted into a pre-existing order, each base address register in said array of base address registers contains a base address and each of the base addresses contained in said base address registers designates an identifying address of a specific external device, the method comprising:
   receiving a configuration command for a port in said switching device to be reconfigured, the configuration command comprising a new base address;
   identifying a base address register in said array associated with the port in said switching device to be reconfigured;
   sequentially comparing said new base address to a prior base address in said array of sorted base address registers;
   designating a base address register in said array of base address registers as an insertion point into which to write said new base address in said configuration command if said new base address is greater than said prior base address, wherein the base address register in said array of base address registers designated as an insertion point is determined by:
      dividing the array of base address registers into a plurality of base address intervals;
      identifying the base address interval of the plurality of base address intervals in which the new base address belongs by using a first plurality of comparators to simultaneously compare the new base address to one of the base address registers in each of the plurality of base address intervals; and
      after the base address interval has been identified in which the new base address belongs, determining the base address register in said array of base address registers designated as the insertion point base by using a second plurality of comparators to simultaneously compare the new base address to each of the base address registers in the identified base address interval;

generating a shift vector to direct the shifting of the contents of one or more base address registers in said array of base address registers, wherein the shift vector is a multi-bit digital word comprising directions for each base address register in said array of base address registers to either; make no change to its content, replace its content with the content from the configuration command, replace its content with the content of a next lower base address register or replace its content with the content of the next higher base address register;

shifting the contents of said one or more base address registers in said array of base address registers in accordance with the shift vector and inserting the new base address register at the insertion point, wherein said shifting and inserting preserves the pre-existing sorted order of the content of said array of base address registers and wherein said inserting and said shifting of the contents of the one or more base address registers to preserve the pre-existing sorted order is accomplished in a single clock cycle.

17. The method described in claim 16 wherein said comparing comprises comparing said new base address to the next numerically smaller prior base address in said array if said prior base address in said array is larger than said new base address.

18. The method described in claim 16 wherein said generating a shift vector comprises writing an instruction for a multiplexer enabled to select an input to a base address register.

19. The method described in claim 18 wherein said shift vector directs the input selection of a set of multiplexers.

20. The method described in claim 16 wherein said shifting comprises writing the contents of a base address register into a logically adjacent base address register.

21. The method described in claim 20 wherein said shifting is enabled to be accomplished in more than one logical direction.

22. The method described in claim 16 wherein said switching device is implemented in a system conforming to a third generation input/output system that implements a serial, switched-packet, point-to-point communication standard at the system level.

* * * * *